(12) United States Patent
Yi et al.

(10) Patent No.: US 9,886,023 B2
(45) Date of Patent: Feb. 6, 2018

(54) METHOD FOR MANAGING TURRET TOOLS BY USING VISUAL INFORMATION FOR MACHINE TOOL

(71) Applicant: Doosan Infracore Co., Ltd., Incheon (KR)

(72) Inventors: Ji Eun Yi, Gyeonggi-do (KR); Sung Hoon Cho, Gyeonggi-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 355 days.

(21) Appl. No.: 14/436,749

(22) PCT Filed: Oct. 17, 2013

(86) PCT No.: PCT/KR2013/009277
§ 371 (c)(1),
(2) Date: Apr. 17, 2015

(87) PCT Pub. No.: WO2014/062010
PCT Pub. Date: Apr. 24, 2014

(65) Prior Publication Data
US 2016/0187871 A1    Jun. 30, 2016

(30) Foreign Application Priority Data
Oct. 18, 2012  (KR) .................. 10-2012-0115845

(51) Int. Cl.
G05B 19/401    (2006.01)
G05B 19/402    (2006.01)
(Continued)

(52) U.S. Cl.
CPC ....... G05B 19/4093 (2013.01); B23Q 1/0045 (2013.01); B23Q 3/155 (2013.01);
(Continued)

(58) Field of Classification Search
CPC .... G05B 19/40938; G05B 2219/35344; B23Q 2003/15586; B23Q 2220/002
(Continued)

(56) References Cited

U.S. PATENT DOCUMENTS 4,639,855 A * 1/1987 Sekikawa ........ G05B 19/40938
700/182
5,933,353 A * 8/1999 Abriam ............. G05B 19/4097
700/171
(Continued)

FOREIGN PATENT DOCUMENTS

CN        1970224 A     5/2007
CN        101000498 A   7/2007
(Continued)

OTHER PUBLICATIONS

European Search Report dated Jul. 5, 2016 for European Application No. 13846702.2, 4 pages.
(Continued)

Primary Examiner — Michael J Brown
(74) Attorney, Agent, or Firm — John D. Veldhuis-Kroeze; Westman, Champlin & Koehler, P.A.

(57) ABSTRACT

The present disclosure relates to a method for managing turret tools for a machine tool, and more particularly, by setting tool information and changing a mounting location of the tool, which is to be mounted or has been mounted, by using visual information about a turret mounted in the machine tool and the tool mounted in the turret, a user may intuitively check information about a tool mounted on the turret and to easily set tool installation information which needs to be set when mounting and detaching the tool, changing a location of the tool, or installing the tool in a machine tool.

9 Claims, 5 Drawing Sheets

(51) Int. Cl.
*G05B 19/4093* (2006.01)
*B23Q 1/00* (2006.01)
*B23Q 17/24* (2006.01)
*B23Q 3/155* (2006.01)

(52) U.S. Cl.
CPC ... *B23Q 17/2409* (2013.01); *G05B 19/40938* (2013.01); *B23Q 2003/15586* (2013.01); *B23Q 2220/002* (2013.01); *G05B 2219/32128* (2013.01); *G05B 2219/36186* (2013.01); *Y02P 90/265* (2015.11)

(58) Field of Classification Search
USPC ................................. 700/173, 175, 178, 179
See application file for complete search history.

(56) References Cited

U.S. PATENT DOCUMENTS

| | | | |
|---|---|---|---|
| 6,112,133 | A | 8/2000 | Fishman |
| 6,236,399 | B1 | 5/2001 | Nishiyama et al. |
| 2007/0163414 | A1 | 7/2007 | Senda et al. |
| 2012/0265330 | A1* | 10/2012 | Beck .................. G05B 19/4068 700/95 |

FOREIGN PATENT DOCUMENTS

| | | |
|---|---|---|
| DE | 102009023648 A1 | 12/2012 |
| EP | 0902343 A2 | 3/1999 |
| JP | H06-289920 A | 10/1994 |
| JP | H07-29256 B2 | 4/1995 |
| JP | 2000-066709 A | 3/2000 |
| KR | 10-2010-0135513 A | 12/2010 |
| TW | 400256 B | 8/2000 |

OTHER PUBLICATIONS

Chinese Office Action dated Feb. 4, 2017 for Chinese Application No. 201380054513.4, 2 pages.
International Search Report from the Korean Intellectual Property Office dated Jan. 24, 2014 for corresponding International Application No. PCT/KR2013/009277, filed Oct. 17, 2013.
Chinese Office Action dated Mar. 23, 2016 for Chinese Application No. 201380054513.4, 6 pages.

* cited by examiner

Fig. 1

| NO | TYPE | TOOL LIST TOOL NAME | DP | FIRST CUTTING REGION | | | | | | Insrt lngth |
|---|---|---|---|---|---|---|---|---|---|---|
| | | | | X-AXIS | Z-AXIS | RADIUS | | | | |
| 1 | | TOOL 1 | 1 | 78.057 | 37.260 | 0.800 | ↓ | 93.0 | 80 | 15.0 |
| 2 | | TOOL 2 | 1 | 83.546 | 26.106 | 4.000 | | | | |
| 3 | | | | | | | | | | |
| 4 | | TOOL 3 | 1 | 82.237 | 119.689 | 5.000 | | 118.0 | | |
| 5 | | TOOL 4 | 1 | 86.687 | 37.666 | 0.100 | ↓ | 92.0 | 35 | 14.0 |
| 6 | | TOOL 5 | 1 | 69.398 | 91.495 | 10.000 | | 0.300 | | |
| 7 | | TOOL 6 | 1 | 84.694 | 37.361 | 1.000 | | 4.000 | | 5.0 |
| 8 | | TOOL 7 | 1 | 66.369 | 45.698 | 0.600 | | 8.000 | | |
| 9 | | TOOL 8 | 1 | 86.592 | 36.697 | 0.000 | | | | |
| 10 | | TOOL 9 | 1 | 0.000 | 113.150 | 8.000 | → | | 4 | |
| 11 | | TOOL 1 | 2 | 80.657 | 35.687 | 0.700 | ↓ | 93.0 | 80 | 13.0 |
| 12 | | TOOL 10 | 1 | 7.011 | 33.599 | 0.200 | | 95.0 | 50 | 12.0 |
| | | TOOL 11 | 1 | 199.655 | 5.538 | 6.000 | | | | |

METHOD FOR MANAGING TURRET TOOLS BY USING VISUAL INFORMATION FOR MACHINE TOOL

CROSS-REFERENCE TO RELATED APPLICATION

This Application is a Section 371 National Stage Application of International Application No. PCT/KR2013/009277, filed Oct. 17, 2013 and published, not in English, as WO 2014/062010A1 on Apr. 24, 2014.

FIELD OF THE DISCLOSURE

The present disclosure relates to a method for managing turret tools for a machine tool, and more particularly, to a method for managing turret tools by using visual information for a machine tool, which is capable of enabling a user to intuitively check information about a tool mounted in a turret and to easily set tool installation information which needs to be set when mounting and detaching the tool, changing a location of the tool, or installing the tool in a machine tool by setting tool information and changing a mounting location of the tool, which is to be mounted or has been mounted, by using visual information about the turret mounted in the machine tool and the tool mounted in the turret.

BACKGROUND OF THE DISCLOSURE

A numerical control (NC) lathe selects necessary unit processes according to a shape of a workpiece desired to be processed and tools required for each unit process while processing manufactured goods, and designs an application order of each unit process. An insertion order of a tool, which is to be called in an NC processing program, is determined according to an order of a unit process to be applied. In the NC processing program, a tool of a corresponding post of a tool rest is set to a location, at which processing is performed, by calling a number of the post, at which the tool required for a corresponding unit process among tools is installed in respective posts of the tool rest (turret) in advance. Then, a transfer of the tool rest and a rotation of a spindle are controlled according to a command of the NC processing program, so that desired processing is performed.

Accordingly, software for supporting writing of the NC processing program enables a user to conveniently select a tool in accordance with a designed process and disposes the selected tool on a tool rest. Further, the software for supporting writing of the NC processing program essentially needs to include a series of management functions, such as exchanging and removing a tool, and changing installation information about the tool.

Here, tool information, which the software for supporting writing of the NC processing program needs to manage, may be generally divided into two types of information. The first type of information is inherent information about a tool, such as a material, a shape, an application process, and a model name of a tool. The inherent information about a tool is not influenced by a machine tool in which the tool is installed. Further, the inherent information about the tool is not changed during use from an installation time of the tool on the tool rest to the end of a life of the tool. The second type of information is tool installation information of a tool machine, such as a number of a tool post, at which a tool is mounted, a number of a cutting knife, whether a coolant is supplied, a coolant supply method, a mounting direction of a tool, a rotation direction of a spindle, and classification information about an applied cutting knife, which is to be used in a step, in which a tool is installed in a tool rest of a tool machine and cutting processing is actually performed. Here, the tool installation information is changed according to performance or a characteristic of a machine tool, an attachment method of a tool according to a workpiece, a cutting method, and an abrasion level of a currently used tool, and the like. In order to write the NC program, it is necessary to determine accurate installation information about a tool, as well as inherent information about the tool. When the software for supporting writing of the NC processing program supports a function of conveniently referring to, setting, and changing all of the tool information if possible, the software for supporting writing of the NC processing program may be helpful to a user in terms of convenience, productivity, and reliability in manufacturing the NC program.

FIG. 1 is an example diagram of a tool management image applied to general software for supporting production of an NC processing program.

A registered tool list is displayed on a tool management image 100 of the software for supporting production of the NC processing program. Further, tools used in a processing process are divided by assigning numbers of tool posts, which have been installed or are to be installed, to tools, which need to be installed in turrets, in the tool list. The tool list represents inherent information and installation information about tools in a form of a table. The tool management image of the software for supporting production of the NC processing program is designed so as to enable a user to set or change installation information about each tool considering processed goods to be processed, a characteristic of a machine tool, and the like.

As illustrated in FIG. 1, the tool management image 100 of the software for supporting production of the NC processing program is divided into respective columns, and is displayed with a number 101 of a tool post at which a tool is installed, the type 102 of tool, a tool name 103, a substitution application ranking 104 of a substitutable tool, an X-axis overhang 105, an Y-axis overhang 106, a nose radius 107 of a tool, a cutting knife direction 108, a cutting knife angle 109, a tool angle 110, and a cutting knife length 111. Display values of the respective columns of some items may be changed into and displayed with values, which may represent the respective tool according to the type of tool.

In the meantime, the tool management image 100 of the general software for supporting production of the NC processing program simply provides values of respective items of inherent tool information and installation information about tools required for writing the NC program in a form of a list or a sheet. The tool management image 100 is implemented so that a user selects each item, of which a correction is required, and directly inputs the selected item through a key. The tool management image 100 has a problem in that it is difficult for a user to intuitively recognize a mounting state of a tool even though the tool management image 100 has a function of providing all of the information about necessary tools, and enabling a user to appropriately change items, which need to be changed according to various conditions. Further, the tool management image 100 has a problem in that convenience in terms of a management is not high because a user needs to select a tool, of which a change is required, and set or correct every number of a corresponding post when mounting or detaching a tool, and changing a location of the tool.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

In order to minimize difficulty in intuitively recognizing a tool management situation and inconvenience that a user needs to select a corresponding tool and directly input information about the corresponding tool in order to install, move, change, and remove the tool when information about a tool is managed in a form of a table, exemplary embodiments of the present disclosure provide a method for managing turret tools by using visual information for a machine tool, which divides possessed tools and tools to be used for processing, and divides a possessed tool management function and a turret tool management function, and uses visual information about a turret on a turret tool management image, so that a user may intuitively recognize installation, movement, exchange, and removal situations of a tool to be used for processing and usability and convenience of the tool management may be increased, thereby finally contributing to improving processing productivity.

According to a first aspect of the present disclosure, there is provided a method for managing turret tools by using visual information for a machine tool, the method including: defining tools required for a processing process of a machine tool; determining a tool mounting location of the defined tool on a turret; displaying a virtual image of the turret; mounting the tool on the displayed virtual image of the turret according to the determined tool mounting location; and checking whether the defined tools corresponding to the determined tool mounting positions are mounted.

The method may further include changing a tool mounting location of the mounted tool by using a soft key.

The method may further include: checking a turret number for checking whether a corresponding tool is mounted for each number of the displayed turret; and searching for a tool corresponding to the number of the displayed turret in a tool database by selecting a tool database soft key, and mounting the searched tool.

The method may further include: checking tool information by checking whether installation information about the mounted tool corresponds to preset installation information about a tool; and correcting tool installation information by selecting a tool correction soft key when the installation information about the mounted tool does not correspond to preset installation information about a tool.

According to the exemplary embodiments of the present disclosure, there is an effect in that a user is capable of intuitively recognizing installation, movement, exchange, and removal situations of a tool to be used for processing by dividing possessed tools and tools to be used for processing, dividing a possessed tool management function and a turret tool management function, and utilizing visual image information about a turret on a turret tool management image in order to minimize difficulty in intuitively recognizing a tool management situation and inconvenience that a user needs to select a corresponding tool and directly input information about the corresponding tool in order to install, move, change, and remove the tool when information about a tool is managed in a form of a table.

Further, according to the exemplary embodiments of the present disclosure, there is an effect in that it is possible to easily check a disposition of a tool on a turret in advance, thereby improving convenience and reliability of a tool management. That is, according to the exemplary embodiments of the present disclosure, there is an effect in that a mounting location of a tool to be used is first determined during a tool setting process by intuitively recognizing interference between tools through a virtual image of a turret, and then easily adjusting the interference between the tools one more time.

Further, according to the exemplary embodiments of the present disclosure, there is an effect in that it is possible to easily optimize the number of times of rotation of a turret by checking a tool disposed in a virtual image of an actual turret. For example, when the tools are mounted in an order to an outer diameter (number 1)—a drill (number 3)—a screw (number 5), but an actual work order is the outer diameter—the screw—the drill, the turret needs to be rotated six times. In this case, when a user intuitively changes the work order to an order of the outer diameter (No. 1)—the screw (No. 3)—the drill (No. 5) through a virtual image of the turret, the turret may be rotated only four times. As described above, according to the exemplary embodiments of the present disclosure, there is an effect in that it is possible to innovatively improve general process efficiency and productivity.

Further, according to the exemplary embodiments of the present disclosure, there is an effect in that it is possible to finally check and supplement a tool application situation before processing by displaying installation information about a tool in a form of a pop-up window on a turret tool management image, and enabling a user to set or correct the installation information about the tool.

Further, according to the exemplary embodiments of the present disclosure, there is an effect in improving convenience in a tool management and thus improving processing productivity by simply moving, re-disposing, and removing a tool by using a soft key in connection with a virtual image of a turret.

DESCRIPTION OF THE DRAWINGS

FIG. 1 is an example diagram of a tool management image applied to general software for supporting production of the NC processing program.

Figure 2:
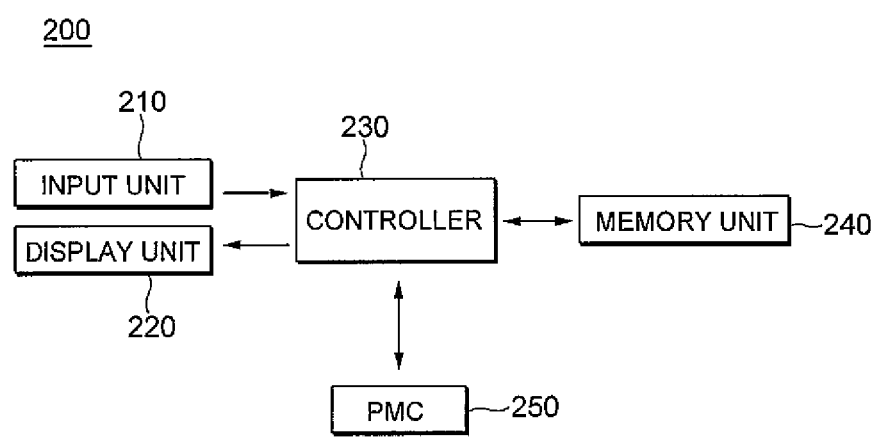
FIG. 2 is a configuration diagram of a turret tool management apparatus using visual information for a machine tool according to an exemplary embodiment of the present disclosure.

| Description of Main Reference Numerals of the Drawings | |
| --- | --- |
| 200: Turret tool management apparatus | 210: Input unit |
| 220: Display unit | 230: Controller |
| 240: Memory unit | 250: PMC |
| 401: Tool management menu item | 402: Tool turret tap |
| 403: Tool turret image | 404: Tool turret number |
| 405: Tool image | 406: Tool table |
| 407: Tool number | 408: Offset number of tool |
| 409: Type of tool | 410: Tool name |
| 411: Inherent information about tool | 412: Rotation direction of spindle |
| 413: Information about internal/external cutting oil of tool | |
| 414: Home soft key | 415: Tool DB soft key |
| 416: Tool mounting soft key | 417: Tool separation soft key |
| 418: All tool separation soft key | 419: Move-up soft key |
| 420: Move-down soft key | 421: Tool correction soft key |
| 422: Input tool mounting information storing soft key | |
| 423: Termination soft key | |

DETAILED DESCRIPTION

Hereinafter, an exemplary embodiment of the present disclosure will be described in detail with reference the accompanying drawing. A configuration of the present disclosure and an operational effect according to the configuration of the present disclosure will be clearly understood by the detailed description below. In the following description, the same elements will be designated by the same reference numerals although they are shown in different drawings, and a detailed explanation of known related functions and constitutions may be omitted when it is determined that the detailed explanation obscures the subject matter of the present disclosure.

FIG. 2 is a configuration diagram of a turret tool management apparatus using visual information for a machine tool according to an exemplary embodiment of the present disclosure.

As illustrated in FIG. 2, a turret tool management apparatus 200 using visual information includes an input unit 210, a display unit 220, a controller 230, a memory unit 240, and a programmable machine controller 250.

The input unit 210 is a means for inputting data required for a tool management, and includes a key for selecting a process plan of tool processing and inputting detailed variables, such as mounting a tool, changing a location of a tool, or changing tool installation information in the selected process plan, and transmits an electric signal corresponding to the key input by a user to the controller 240. To this end, the input unit 210 may simply include a four-directional (up, down, left, and right directional) key and a mouse. In this case, the four-directional key and the mouse may set a selection of a conversational program or a focusing operation according to the exemplary embodiment of the present disclosure, and an ascent and a descent of a variable after focusing.

For example, the input unit 210 includes a soft key for inputting values of tool mounting, tool separation, separation of all tools, move up, move down, tool correction, input completion, and the like in order to manage a tool, and outputs a signal corresponding to a key input by a user to the controller 230. The input unit 210 according to the present exemplary embodiment may be provided as a separate manipulation plate, but may be provided to the display unit 220 in a form of a touch screen.

The display unit 220 displays all of the images related to the conversational program for the tool management under a control of the controller 230. That is, the display unit 220 may output a basic tool management image after execution of the conversational program, an input image for the tool management according to a selection of a detailed menu item in the basic tool management screen, and the like. The display unit 220 displays a virtual image of a turret and a tool, and displays a setting image of a process and tool management, through which the process and tool data may be set, in order to manage a process and a tool.

Here, a tool management image means an adjustment image throughout an entire process of inputting and setting tool data required for the tool management, and may include an image for inputting and setting tool data, an image for changing a desired tool in the set tool data, an image for adjusting tool installation information, and the like. When the display unit 200 is provided in the form of a touch screen, through which selection and focusing are available through a direct touch on a screen, the display unit 220 may integrally implement an input function of the input unit 210.

The memory unit 240 stores the conversational program required for managing a tool for a machine tool and a control program for controlling a general operation of a system through a processor.

Further, the memory unit 240 according to the exemplary embodiment of the present disclosure stores tool data, such as tool installation information input by a user's request, and stores each input data as tool management data. The memory unit 240 is a predetermined computer readable recording medium, and may be a hard disk, a flash memory, a RAM, a ROM, and the like which are an embedded type, or an optical disk, such as a CD-R and a CD-RW, a compact flash card, smart media, a memory stick, and a multimedia card which are an external type.

The controller 230 sets various information required for tool management of a machine tool by using the conversational program. The controller 230 may basically control a menu item selection, process setting, a tool selection, a tool location change, and the like according to a signal input through the input unit 210. Particularly, when execution of the conversational program is requested through the input unit 210, the controller 230 executes the conversational program for the tool management stored in the memory unit 240 and outputs the executed conversational program to the display unit 220, and when a predetermined soft key is selected through the input unit 210 in the tool management image of the output conversational program, the controller 230 displays main setting and information corresponding to the selected soft key.

To this end, the controller 230 defines a tool required for a processing process of a numerical value control device, and determines a tool mounting location on a turret for the defined tool. Further, the controller 230 displays a virtual image of the turret through the display unit 220, and displays an image of the tool to be mounted on the displayed turret, through the display unit 220. Next, the controller 230 mounts the tool on the displayed virtual image of the turret according to a tool mounting location according to an input of a user, and displays the mounted tool through the display unit 220.

Further, the controller 230 may enable a user to check whether the defined tool is mounted according to the tool mounting location, and change the tool mounting location by using the soft key. In this case, the controller 230 may check whether a tool corresponding to each number of a displayed turret is mounted through the display unit 220. Further, the controller 230 may search for a tool corresponding to each number of a turret according to a selection of a tool database soft key by a user and mount the searched tool.

Further, the controller 230 displays a tool correction pop-up window through the display unit 220, and receives setting information about a mounted tool from a user, corrects the setting information about the tool, and stores the corrected setting information about the tool in the memory unit 240.

Further, the controller 230 may output tool management data about the mounting of the tool to the PMC 250 and make a tool mounting operation be performed.

Then, the PMC 250 mounts a corresponding tool or changes a mounting location of the tool based on the tool management data input from the controller 230.

Figure 3:
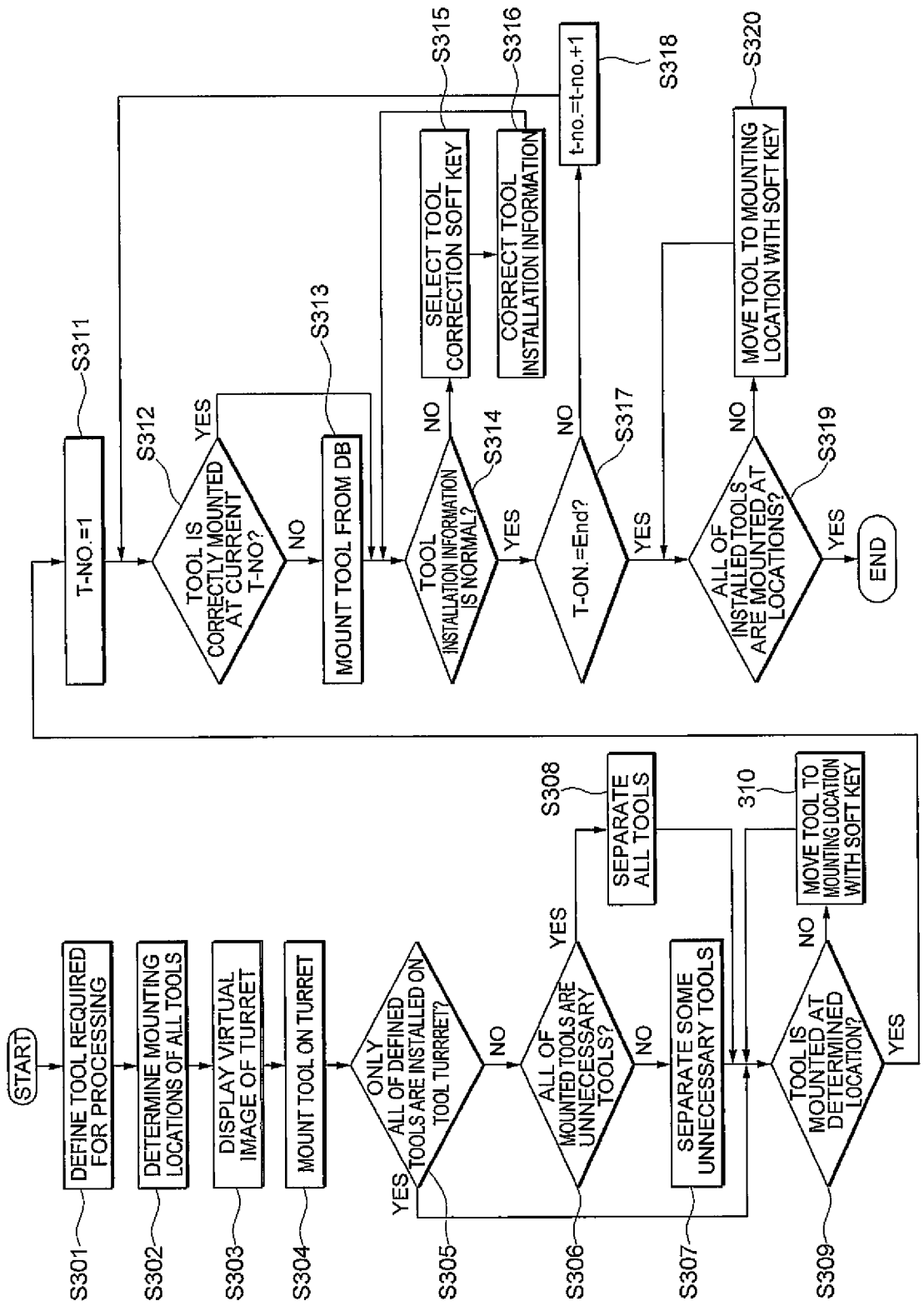
FIG. 3 is a flowchart of an example of a turret tool management method using visual information for a machine tool according to the exemplary embodiment of the present disclosure.

FIG. 3 is a flowchart of an example of a turret tool management method using visual information for a machine tool according to an exemplary embodiment of the present disclosure.

The turret tool management apparatus 200 using visual information for a machine tool according to the exemplary embodiment of the present disclosure checks whether a necessary tool is actually mounted on a tool turret of an NC lathe. Then, the turret tool management apparatus 200 mounts the tool on the tool turret of the conversational program in an order of FIG. 3 so as to be identical to information in a tool turret tap of a tool management menu item of the conversational program for the tool management.

As illustrated in FIG. 3, the turret tool management apparatus 200 receives a tool required for processing from a user and defines the tool (S301). The turret tool management apparatus 200 may complete the process through process setting of FIG. 4 and the like.

Further, the turret tool management apparatus 200 determines mounting locations of the entire defined tools (S302).

Figure 4:
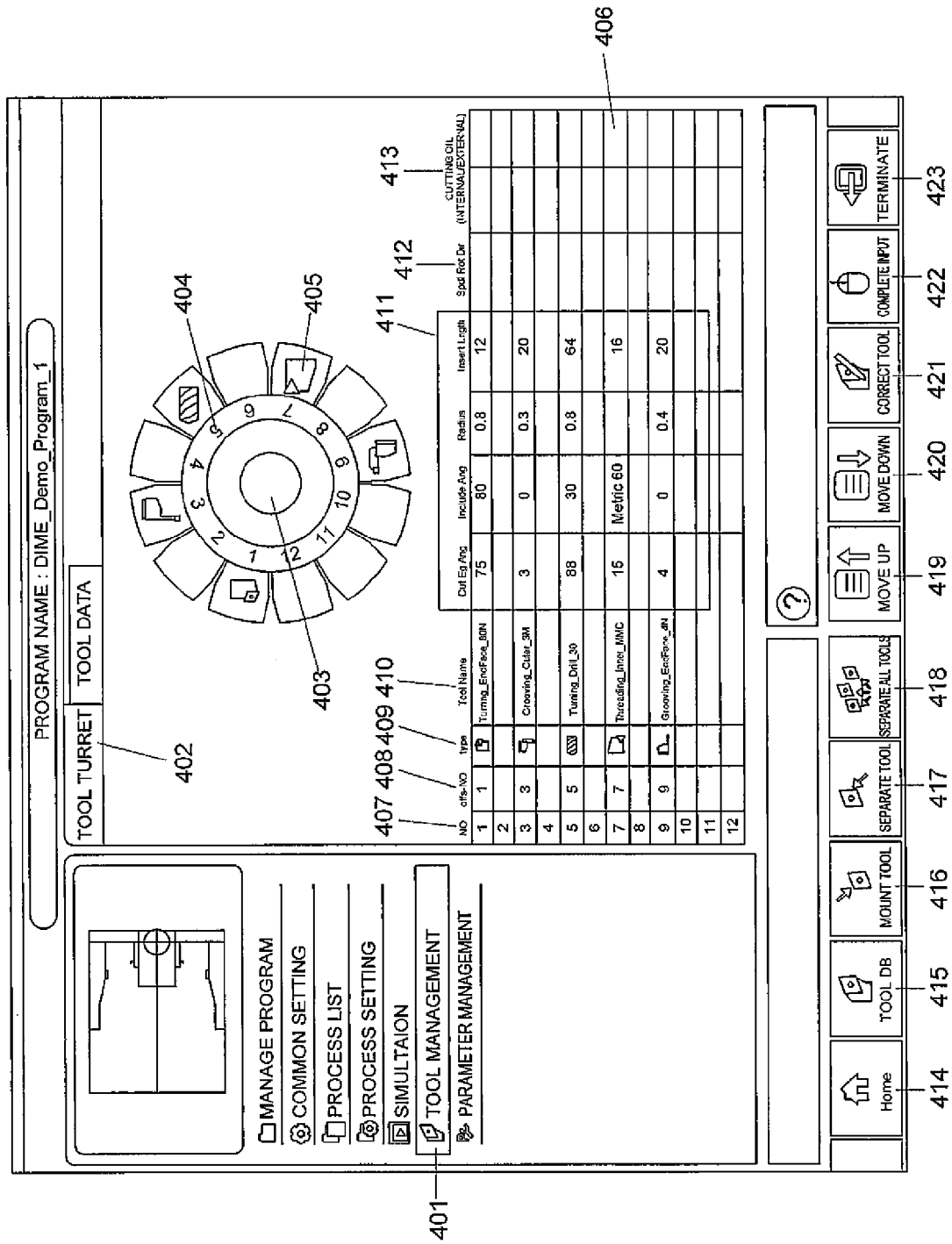
FIG. 4 is an example diagram of a turret tool management image of a conversational program for a tool management using visual information according to the exemplary embodiment of the present disclosure.

Next, the turret tool management apparatus 200 displays a virtual image of a turret like a tool management image of FIG. 4 (S303).

Next, the turret tool management apparatus 200 mounts a tool on the displayed turret according to a selection of a soft key by the user (S304).

Then, the turret tool management apparatus 200 checks whether only all of the defined tools are installed in an image of the tool turret (S305).

As a result of the check (S305), when the defined tool is not installed on the tool turret, that is, all of the defined tools are not installed on the tool turret, or an unnecessary tool, other than the defined tool, is mounted, the turret tool management apparatus 200 checks whether all of the mounted tools are unnecessary tools (S306). That is, the turret tool management apparatus 200 checks whether the unnecessary tools are all of the mounted tools or some of the mounted tools.

As a result of the check (S306), when the unnecessary tools are not all of the mounted tools, that is, only some tools are unnecessary tools, the turret tool management apparatus 200 separates only the unnecessary tool through the selected soft key (S307). By contrast, as a result of the check (S306), when all of the mounted tools are the unnecessary tools, the turret tool management apparatus 200 separates all of the tools through the selected soft key (S308).

Then, the turret tool management apparatus 200 checks whether the tool is mounted according to the location determined in operation S302 (S309). In the meantime, as the result of the check (S305), when the defined tool is installed on the tool turret, the turret tool management apparatus 200 performs operation S309.

As the result of the check (S309), when the tool is not mounted according to the determined location, that is, the tool is mounted at an incorrect location, the turret tool management apparatus 200 moves the tool to a place where the tool had been located through a selected move-up or move-down soft key (S310).

By contrast, as the result of the check (S309), when the tool is mounted according to the determined location, the turret tool management apparatus 200 moves a focus to tool number 1 (T-No.=1) at a first line of a tool table in the tool management image (S311).

Further, the turret tool management apparatus 200 checks whether a tool defined with the tool number (T-No.=1), at which the focus is currently present, is correctly mounted (S312).

As a result of the check (S312), when the tool defined with the tool number (T-No.=1), at which the focus is currently present, is not correctly mounted, the turret tool management apparatus 200 searches for a tool appropriate to the tool number (T-No.=1) from a tool database through a selected tool DB soft key and mounts the searched tool (S313).

By contrast, as the result of the check (S312), when the tool defined with the tool number (T-No.=1), at which the focus is currently present, is correctly mounted, the turret tool management apparatus 200 checks whether tool installation information about a current tool is normal (S314). For example, the tool installation information includes an offset number (Offset-No.), a rotation direction of a spindle, and internal/external cutting oil, and the like.

As a result of the check (S314), when the tool installation information about the current tool is not normal, the turret tool management apparatus receives a clock of a tool correction soft key from the user (S315).

Further, the turret tool management apparatus 200 corrects tool installation information according to an input of the user (S316). In this case, the turret tool management apparatus 200 may display a pop-up window for correcting the tool installation information through the selected tool correction soft key. Here, when the turret tool management apparatus 200 receives desired information, such as the offset number, the rotation direction of the spindle, and the internal/external cutting oil, and a confirmation button from the user, the turret tool management apparatus 200 stores the information selected by the user. Further, the turret tool management apparatus 200 performs a process S312 of checking whether the tool installation information is normal.

As a result of the check (S314), when the tool installation information about the current tool is normal, the turret tool management apparatus 200 checks whether a tool defined with a tool number (T-No.) indicated by the current focus is the last tool number (T-No=END) (S317).

As a result of the check, when the tool number indicated by the current focus is not the last tool number, the turret tool management apparatus 200 adds 1 to the current tool number (T-No.) (S318).

Further, the turret tool management apparatus 200 performs the process from the operation S312. In this case, the turret tool management apparatus 200 repeatedly performs a loop several times until the tool number is the last tool number (T-No.=END).

Then, when the tool number (T-No.), at which the focus is currently present, is the last tool mounting step (ST-No.=END) after repeatedly performing the loop several times, the turret tool management apparatus 200 checks whether all of the installed tools are mounted at the determined positions (S319).

When a location of the installed tool is incorrect as a result of the check (S319), the turret tool management apparatus 200 performs the operation S319 of moving a mounting location of the tool by using a tool movement soft key, and checking whether all of the installed tools are mounted at the determined locations again (S320).

As the result of the check (S319), when the checking of the location of the tool is completed, the turret tool management apparatus 200 terminates the tool management work for mounting the tool through a selected input completion soft key.

Then, the turret tool management apparatus 200 may check whether the corresponding tool is mounted at the tool mounting location determined in operation S302 so as to be optimized for an actual work order. In this case, the turret tool management apparatus 200 may change the order of mounting the tool on the turret as necessary. That is, the turret tool management apparatus 200 may check the tool disposed on the virtual image of the actual turret and easily optimize a rotation number of the turret. For example, when the tools are mounted in an order to an outer diameter (No. 1)—a drill (No. 3)—a screw (No. 5), but an actual work order is the outer diameter—the screw—the drill, the turret needs to be rotated six times. In this case, when the turret tool management apparatus 200 intuitively changes a tool mounting order to the outer diameter (No. 1)—the screw (No. 3)—the drill (No. 5) through the virtual image of the turret, the turret may be rotated only four times.

In the meantime, the turret tool management apparatus 200 may check whether all of the tools mounted in the virtual image of the turret are actually and correctly mounted on the turret. The turret tool management apparatus 200 may compare the tools actually mounted on the turret and the tools mounted in the virtual image of the turret, and check whether the tool is actually mounted before actual work.

FIG. 4 is an example diagram of a turret tool management image of the conversational program for the tool management using visual information according to the exemplary embodiment of the present disclosure.

The conversational program for the tool management according to the exemplary embodiment of the present disclosure may be performed by the turret tool management apparatus 200, and has the purpose of enabling a user to actually mount a tool required for processing a material on a tool turret of the NC lathe, and then easily and visually manage information about the tool on the tool turret mounted on the NC lathe through the conversational program for the tool management.

To this end, in the conversational program for the tool management in the NC lathe, entire menu item parts of the conversational program for the tool management is displayed, and a tool management menu item 401 among the entire menu items is displayed. When a user clicks the tool management menu item 401, an image of a tool turret tap 402 is displayed.

The tool turret tap 402 represents a tap for mounting a tool on a tool turret in the tool management menu item. A tool turret image 403, a tool turret number 404, and an image 405 of a tool mounted on the tool turret are displayed. Here, the tool turret image 403 is similar to an actual shape of the tool turret of the NC lathe, and this helps a user to easily manage a tool used in the conversational program of the tool management.

Further, the conversational program of the tool management may display a state in which the tool required for processing is actually installed on the tool turret of the NC lathe as illustrated in FIG. 4, so that the user may intuitively recognize an installation state of the tool based on information of the image. The number of tools mountable on the tool turret supported by the conversational program of the tool management is different according to a machine tool used. According to the exemplary embodiment of the present disclosure, 12 turrets are configured as illustrated in FIG. 4.

A tool post number is written as the tool turret number 404 in the tool turret tap 402. The tool image 405 represents a tool image displayed when the user mounts the tool in the tool turret image of the conversational program of the tool management.

A tool table 406 displaying tool information is displayed at a lower end of the tool turret image 403. The tool table 406 represents information about the tool mounted on the tool turret. The tool table 406 includes a tool number (T-No) 407, an offset number (Offset-No) 408 of a tool, the type 409 of tool, a tool name 410, inherent information 411 about a tool, a rotation direction 412 of a spindle, and internal/external cutting oil information 413 of a tool.

Here, the tool number (T-No) 407 is a column representing a number of a tool turret, on which a corresponding tool is mounted, and is displayed by T-No. or T-code.

The offset number (Offset-No) 408 of the tool is a column representing information on an offset number of a corresponding tool. A surface of a tool processed while actually being in contact with a material may be different from an original tool due to abrasion and the like of the tool, and the offset number is information about the difference. Contents of the offset number 408 of the tool may be corrected through the tool correction soft key 421.

The type 409 of the tool is a column representing the type of corresponding tool in a form of an image of the type, and the tool name 410 is a column representing a name of a corresponding tool.

The inherent information 411 about a tool are columns representing inherent information about a corresponding tool, and contents of displayed information are changed according to the type of tool. Accordingly, when a focus moves to another row in the tool management image, an item displayed in the inherent information 411 of the tool is changed.

The rotation direction 412 of the spindle is a column representing a rotation direction of the spindle, and contents of the rotation direction 412 of the spindle may be corrected through the tool correction soft key 421.

The internal/external cutting oil information 413 of the tool is a column representing information about internal/external cutting oil information of the tool. Contents of the internal/external cutting oil information 413 of the tool may be corrected through the tool correction soft key 421.

Further, the tool management image includes a home soft key 414, a tool DB soft key 415, a tool mounting soft key 416 for mounting a tool, a tool separation soft key 417 for separating a tool, an all tool separation soft key 418 for separating all of the tools, move-up and move-down soft keys 419 and 420 for moving a mounted tool in upward and downward directions, the tool correction soft key 421 for correcting contents of tool installation information, an input tool mounting information storing soft key 422 for storing a current tool mounting state of a turret, and a termination soft key 423 for terminating the conversational program for the tool management, which are located at a lower end thereof.

Here, the home soft key 414 represents a soft key for a movement to a home of the conversational program for the tool management.

The tool DB soft key 415 represents a soft key for a movement to a tool DB tap of a tool management menu.

The tool mounting soft key 416 represents a soft key for mounting a desired tool after a user moves the focus to a desired tool number (T-No.). When the user clicks the tool mounting soft key 416, a desired tool among the tools included in a tool DB may be mounted.

The tool separation soft key 417 represents a soft key for separating an unnecessary tool. When the user moves the focus to the tool number (T-No.) of the corresponding mounted tool and presses the tool separation soft key 417, the tool is separated.

The all tool separation soft key 418 represents a soft key for separating all of the tools mounted when the all of the tools mounted on the tool turrets are unnecessary.

The move-up soft key 419 represents a soft key for moving a tool corresponding to a tool number (T-No.), at which the focus is current located, to a tool number (T-No.) over one step.

The move-down soft key 420 represents a soft key for moving a tool corresponding to a tool number (T-No.), at which the focus is current located, to a tool number (T-No.) below one step.

Figure 5:
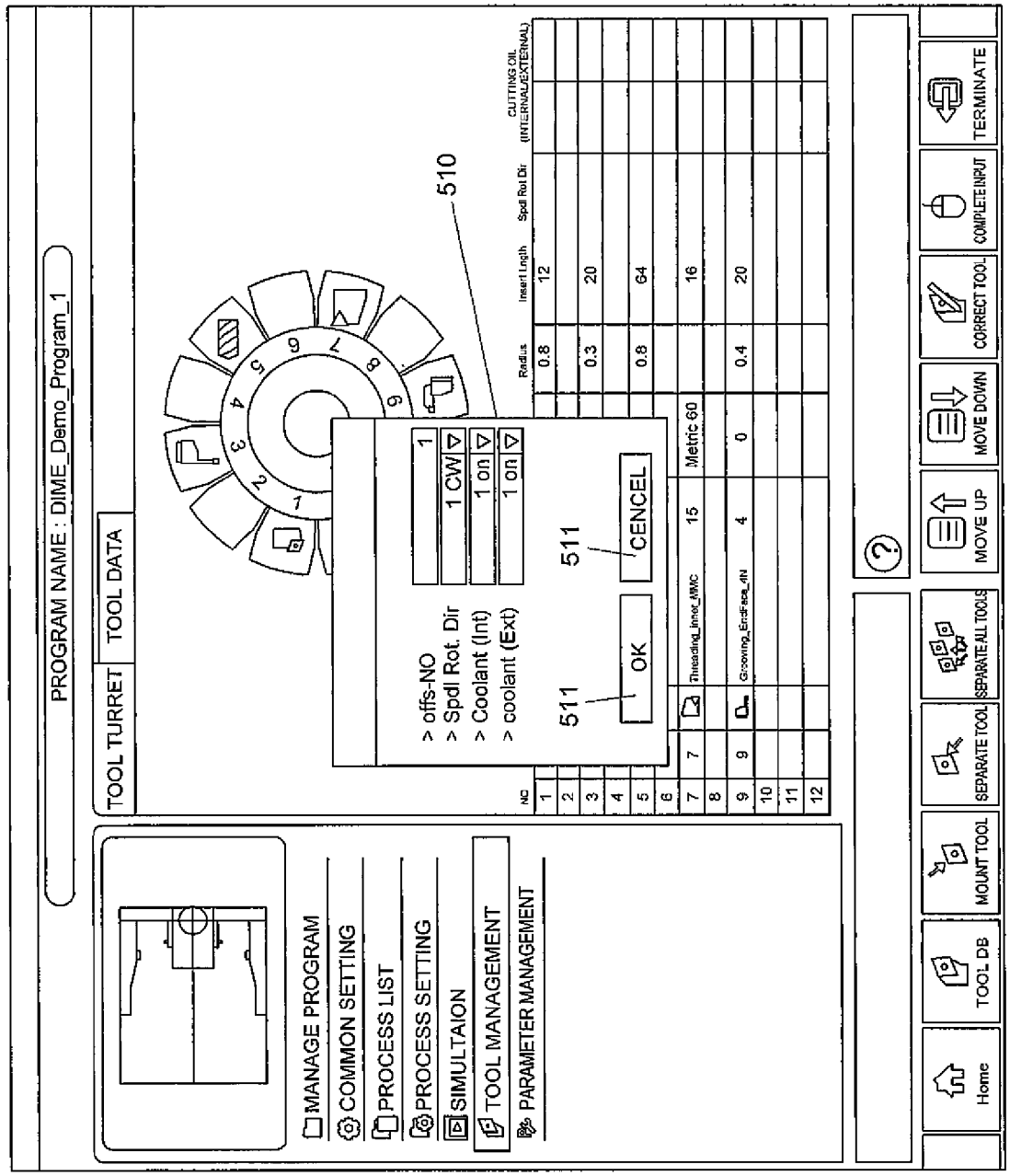
FIG. 5 is an example diagram of a tool correction pop-up window opened when a tool correction soft key is clicked in the conversational program according to the exemplary embodiment of the present disclosure.

The tool correction soft key 421 represents a soft key for correcting the offset number, the rotation direction of the spindle, and contents of internal/external cutting oil, and when the user clicks the tool correction soft key 421, a tool correction pop-up window 510 of FIG. 5 is displayed.

The tool input soft key 422 represents a soft key for storing information about current mounting of a tool.

The termination soft key 423 represents a soft key for terminating the conversational program for the tool management.

FIG. 5 is an example diagram of the tool correction pop-up window opened when the tool correction soft key is clicked in the conversational program according to the exemplary embodiment of the present disclosure.

When the tool correction soft key 421 illustrated in FIG. 4 is clicked, the tool correction pop-up window 510 illustrated in FIG. 5 is displayed in the tool management image. A tool installation information correction/storing ok button 511 and a tool installation information correction/storing cancel button 512 are included in the tool correction pop-up window 510.

The tool correction pop-up window 510 represents a pop-up window displayed when the tool correction soft key 521 is clicked, and an offset number, a rotation direction of a spindle, and contents of internal/external cutting oil may be corrected through the tool correction pop-up window 510.

When a user clicks the tool installation information correction/storing ok button 511, the tool correction pop-up window 510 is closed, and contents on the tool correction pop-up window 510 is corrected/stored.

When a user clicks the tool installation information correction/storing cancel button 512, the tool correction pop-up window 510 is closed, and contents on the tool correction pop-up window 510 is closed without being stored.

In the meantime, the turret tool management method using the aforementioned visual information may be implemented in a software program and recorded in a predetermined computer readable recording medium.

For example, the recording medium may be a hard disk, a flash memory, a RAM, a ROM, and the like which are an embedded type, or an optical disk, such as a CD-R and a CD-RW, a compact flash card, smart media, a memory stick, and a multimedia card, which are an external type, of each reproduction device.

In this case, the program recorded in the computer readable recording medium may execute a turret tool management method for managing values of respective items of inherent tool information and installation information about a tool required for writing the NC program, including: defining tools required for a processing process of a machine tool; determining a tool mounting location of the defined tool on a turret; displaying a virtual image of the turret; and mounting the tool on the displayed virtual image of the turret according to the determined tool mounting location.

A functional operation and an implemented matter described in the specification of the present disclosure may be implemented by a digital electronic circuit, computer software, firmware, or hardware, or a combination of one or more thereof. The implemented matter described in the specification of the present disclosure may be implemented as one or more computer program products, that is, one or more modules for a computer program command encoded in a tangible program storing medium for controlling an operation of a data processing device, or performing execution by the data processing device.

The drawings of the present disclosure illustrate the operation process, which is a specified order illustrated for obtaining a preferable result, and it should not be understood that the operations should be performed or all of the operations illustrated should be performed. In a specific case, multitasking or parallel processing may be advantageous.

Further, the specific exemplary embodiment has been described in the specification of the present disclosure. The exemplary embodiments belong to the claims. For example, the operations defined in the claims may also achieve a preferable result while being performed in a different order.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure shall be construed on the basis of the following claims, and it shall be construed that all of the technical ideas included within the scope equivalent to the claims belong to the present disclosure.

In order to minimize difficulty in intuitively recognizing a tool management situation and inconvenience that a user needs to select a corresponding tool and directly input information about the corresponding tool in order to install, move, change, and remove the tool when information about a tool is managed in a form of a table, the present disclosure may divide possessed tools and tools to be used for processing, and divide a possessed tool management function and a turret tool management function, and utilize visual image information about a turret on a turret tool management image, thereby enabling a user to intuitively recognize installation, movement, exchange, and removal situations of a tool to be used for processing. In this respect, the present disclosure overcomes a limit of the related art, so that relevant technology may be used and a probability of a commercialization or a business of an apparatus, to which the present disclosure is applied, is sufficient, and the present disclosure may be realistically and clearly carried out, to be industrially applicable.

The invention claimed is:

1. A method for managing turret tools by using visual information for a machine tool, which manages values of respective items of inherent tool information and installation information about a tool required for writing a numerical control (NC) program, the method comprising:
 a controller defining a tool required for a processing process of a machine tool;

the controller determining a tool mounting location of the defined tool on a turret;

a display unit, coupled to the controller, displaying a virtual image of the turret;

the display unit displaying a virtual image of mounting the defined tool on the displayed virtual image of the turret according to the determined tool mounting location;

the controller communicating data associated with the determined tool mounting location to a programmable machine controller; and the programmable machine controller mounting the defined tool on the turret according to the data associated with the determined tool mounting location.

2. The method of claim 1, further comprising:

the controller checking whether the defined tool corresponding to the determined tool mounting location is mounted so as to be optimized to an actual work order; and the programmable machine controller changing a tool mounting order on the turret as necessary.

3. The method of claim 1, further comprising:

the controller checking whether an unnecessary tool, which is not defined in the defining of the tool, is mounted on the turret; and the programmable machine controller separating the unnecessary tool from the turret when the unnecessary tool is mounted.

4. The method of claim 1, further comprising:

the controller checking whether all of the defined tools corresponding to the determined tool mounting positions are mounted.

5. The method of claim 1, further comprising:

the controller checking whether all of the tools mounted in the virtual image of the turret are actually and correctly mounted on the turrets.

6. The method of claim 1, further comprising:

the controller changing a tool mounting location of the mounted tool on the display unit when a user selects a soft key on a touchscreen of the display unit.

7. The method of claim 1, further comprising:

the controller checking a turret number for checking whether a corresponding tool is mounted for each number of the displayed turret;

the controller searching for a tool corresponding to the number of the displayed turret in a tool database when a user selects a tool database soft key on a touchscreen of the display unit; and the programmable machine controller mounting the searched tool.

8. The method of claim 1, further comprising:

the controller checking tool information by checking whether installation information about the mounted tool corresponds to preset installation information about a tool; and the controller correcting tool installation information when a user selects a tool correction soft key on a touchscreen of the display unit when the installation information about the mounted tool does not correspond to preset installation information about a tool.

9. The method of claim 1, further comprising:

the programmable machine controller changing a tool mounting location of the mounted tool on the turret.

* * * * *